(12) United States Patent
Rinchiuso

(10) Patent No.: US 6,747,993 B2
(45) Date of Patent: Jun. 8, 2004

(54) METHOD AND APPARATUS FOR ADJUSTING A COMMUNICATION TIMER IN A COMMUNICATION NETWORK

(75) Inventor: Joseph Rinchiuso, Elmhurst, IL (US)

(73) Assignee: Motorola, Inc., Schaumburg, IL (US)

( * ) Notice: Subject to any disclaimer, the term of this patent is extended or adjusted under 35 U.S.C. 154(b) by 265 days.

(21) Appl. No.: 09/775,244

(22) Filed: Feb. 1, 2001

(65) Prior Publication Data

US 2003/0012222 A1 Jan. 16, 2003

(51) Int. Cl.[7] .................................................. H04J 3/16
(52) U.S. Cl. ...................................................... 370/468
(58) Field of Search ................................. 370/350, 394, 370/465, 522, 252, 253, 468; 714/748, 749

(56) References Cited

U.S. PATENT DOCUMENTS

| | | |
|---|---|---|
| 4,110,558 A | 8/1978 | Kageyama et al. |
| 6,101,216 A | 8/2000 | Henderson et al. |
| 6,289,224 B1 * | 9/2001 | Boxall et al. ............... 455/517 |
| 6,483,805 B1 * | 11/2002 | Davies et al. ............... 370/235 |
| 6,526,022 B1 * | 2/2003 | Chiu et al. ................... 370/229 |

FOREIGN PATENT DOCUMENTS

WO    WO 00/33503 A1    6/2000

OTHER PUBLICATIONS

Sun et al. "Hybrid ARQ and Optimal Signal–to–Interference Ration Assignment for High–Quality Data Transmissionin DS–CDMA." European Transactions on Telecommunications, Eurel Publication; Jan. 2001. vol. 12, No. 1, pp 19–29.

* cited by examiner

Primary Examiner—Chau Nguyen
Assistant Examiner—Nittaya Juntima
(74) Attorney, Agent, or Firm—Jeffrey K. Jacobs

(57) ABSTRACT

A method and apparatus for adjusting a communication timer (306) for a communication network is described herein and comprises a communication device (302) capable of receiving data indicating that a data transfer rate has varied from a previous data transfer rate to a new data transfer rate, determining the amount the data transfer rate has varied, and adjusting the communication timer (306) from one set timed interval to a different set timed interval to automatically account for the varying data transfer rate and for optimizing data transfer between networked components.

17 Claims, 3 Drawing Sheets

METHOD AND APPARATUS FOR ADJUSTING A COMMUNICATION TIMER IN A COMMUNICATION NETWORK

BACKGROUND OF THE INVENTION

This invention relates generally to a method and system for adjusting a communication timer in a communication network, and more particularly to a method and apparatus for adjusting an acknowledgment timer for a communication network when the data transfer rate of the system has changed.

Communication networks such as wide area networks (WANs) and local area networks (LANs) rely heavily on the efficient transfer of data from one computer or networked component to another. This efficiency can be greatly affected by the number of users accessing the system at one time. For example, in a wireless telecommunications network the data transfer rate of the entire network typically decreases as the number of users using the network (or traffic) increases. In terms of data transfer speed, the network is no longer operating as efficiently for each user. This decrease in the data transfer rate can disrupt various systems within the communication network and further cause the system to run even less efficiently.

In typical wireless telecommunication networks, the networked components are comprised of base and mobile stations which communicate with each other using a radio link protocol (RLP). Several industry standards are available for implementing such networks and provide generalized functions/features the various systems should follow. For example, IS-95 is a digital code division multiple access (CDMA) protocol standard for U.S. wireless networks set forth by the Telecommunications Industry Association (TIA) and the Electronic Industries Alliance (EIA) in an effort to make wireless network systems somewhat uniform in the US. This standard is repeatedly evaluated and improved on by members of the telecommunications industry.

Today, these groups are implementing third generation CDMA systems (often referred to as CDMA2000 or IS-95-C) which use an octet based RLP to transmit packets of data or information between the base station and the mobile station, and vice versa. The protocol divides the packets into frames for data transmission over communication channels and attaches headers and trailers to each packet and frame to indicate the beginning and end of the packet/frame, and to indicate the sequence number or order in which the packet/frame is to be received in order to recover the original message transmitted. Since the packets are of variable size, some frames may contain only portions of a packet, while others may contain multiple packets for transmission. According to several standards, a frame is typically generated by the RLP every 20 milliseconds (ms). The primary benefit accompanying this new generation industry standard is that higher data transfer rates can be obtained within the network, allowing for the transmission of high speed data at various data transfer rates. Even so, as traffic on these networks continually increases, the data transfer rates will decrease, resulting in undesirable disruption of various systems within the communication network.

For example, several communication networks have acknowledgment systems implemented to confirm receipt and/or failure of receipt of information from one component to another. The idea behind such systems is to keep the network operating efficiently while at the same time ensuring that the communications are being accurately made. In other words, using cellular telephone networks as an example, the acknowledgment system avoids having a user wait on his or her phone for an unduly long period, when it is likely that the voice data his or her unit is awaiting will not be received.

The acknowledgment systems allow for the transmission of high speed data, and rely on timers for determining whether an acknowledgment signal has been received and/or responded to. These timers do not account for changes in the data transfer rate of the network, and are setup to interpret a response to the acknowledgment signal that is delayed by a predetermined amount as a failure to respond irrespective of current data transfer rates in the system. This failure typically causes a second or third acknowledgment signal to be sent, which may not only be unnecessary, but also increases the traffic over the network and further reduces the efficiency of the entire system. The failure may also cause the acknowledgment system to abort efforts in determining whether an acknowledgment signal has been received and/or responded to.

One type of acknowledgment system implemented in computer and telecommunication networks involves polling each component to which information has been sent in order to determine if the information has been received. This can be accomplished by having the components that have received information transmit an ACK ("acknowledge") signal upon receipt of the information. Another type of acknowledgment system implemented in networks involves having components report the fact that they did not receive the information sent to them (e.g., the information was lost, incomplete, or corrupted). This can be accomplished by having the components that have not received the sent information transmit a NAK (negative acknowledge) signal indicating that the information must be re-transmitted. Out of the two systems, the latter NAK system is preferred because it allows for more efficient network operations since only the components needing retransmission of data have to transmit an acknowledgment, whereas with the ACK system, both the components needing retransmission of data and those that do not have to transmit signals.

As mentioned, these acknowledgment systems use timers to determine whether signals have been received by the desired network components and/or to re-transmit signals if need be. For example, the receiving component or network component responsible for transmitting the acknowledgment signal (either ACK or NAK) typically starts an acknowledgment timer upon transmission of the acknowledgment signal. The purpose for the timer is to account for situations in which the acknowledgment signal sent by the receiving component has not been received by the transmitting component or network component responsible for responding to the acknowledgment signal. According to the standardized systems mentioned above, if no signal or response is heard by the receiving component within the predetermined time period of the acknowledgment timer, the receiving component will assume that the acknowledgment signal was lost and will re-transmit the acknowledgment signal and restart the acknowledgment timer. Again, if no signal or response is heard within the predetermined time period of the acknowledgment timer, the receiving component will retransmit the acknowledgment signal a third and final time, and restart the acknowledgment timer. At this point, the timer is often referred to as an abort timer. If the acknowledgment/abort timer expires without the receiving component hearing a response to the third acknowledgment signal, the receiving component will abort its acknowledgment efforts and either continue or drop communications with the transmitting component.

For example, if a NAK system is employed in the telecommunications network discussed above, and a packet/frame is not received by the desired network receiving component, the receiving component in the network will transmit a NAK signal requesting retransmission of the missing packet/frame. Once the NAK signal is transmitted, the receiving component (which could be a base station or a mobile station) starts a retransmission or acknowledgment timer that expires after a predetermined amount of time. Again, the purpose for the timer is to make the network more efficient by accounting for situations in which the NAK signal or NAK request Is not received by the transmitting component (e.g., the NAK signal itself was lost, incomplete, or corrupted). More particularly, the receiving component will wait the predetermined amount of time, and if no response to its NAK signal is received, the receiving component will presume that a problem occurred with respect to the earlier NAK signal.

If the requested packet/frame is received by the receiving component within the predetermined time period, the retransmission timer is suspended and the packet/frame is read according to its sequence number (which identifies the order in which the packets/frames are to be read) in order to reconstruct the original data sent.

If the requested packet/frame is not received within the predetermined amount of time, the receiving component will send another NAK signal to the transmitting component requesting retransmission of the missing packet/frame. The receiving component will again start the retransmission timer and wait for reception of the requested packet/frame. If the requested packet/frame is received, it is read according to its sequence number. If the requested packet/frame is not received, the receiving component will attempt one last request by transmitting a third and final NAK signal. This time however, the receiving component will start an abort timer (acknowledgment timer) that will expire after a predetermined period of time. If the requested packet/frame is not received within the predetermined time period of the abort timer, the receiving component aborts the acknowledgment process.

The acknowledgment systems of today operate without consideration of the data transfer rate of the network. This creates problems when, for instance, the data transfer rates between the networked components decrease (e.g., when network traffic increases) and the response to the receiving component's acknowledgment signal (or series of signals) is delayed to such an extent that it does not reach the receiving component until after the acknowledgment timer has expired. For example, if the networked components are communicating at a high speed data transfer rate when the receiving component transmits a NAK signal, but the communication level decreases to a lower data transfer rate prior to the transmitting component's response to the NAK signal, the transmitting component's response may not be received by the receiving component prior to the expiration of the receiving component's retransmission timer. Since the receiving component's retransmission timer operates independent of the data transfer rate, the receiving component does not account for the fact that the transmitting component is sending the requested response at a slower rate, which leads it to generate an unnecessary NAK request, thereby increasing network traffic and decreasing network throughput.

Thus there is a need for a method and apparatus for that improves efficiency in communications in a communication network. In particular, a need exists for a network acknowledgment system that is capable of adapting to varying data transfer rates. A further need exists for a NAK retransmission timer that is capable of adjustment according to changes in the network.

BRIEF DESCRIPTION OF THE DRAWINGS

Other objects and advantages of the invention will become apparent upon reading the following detailed description and upon reference to the drawings, in which.

Figure 1:
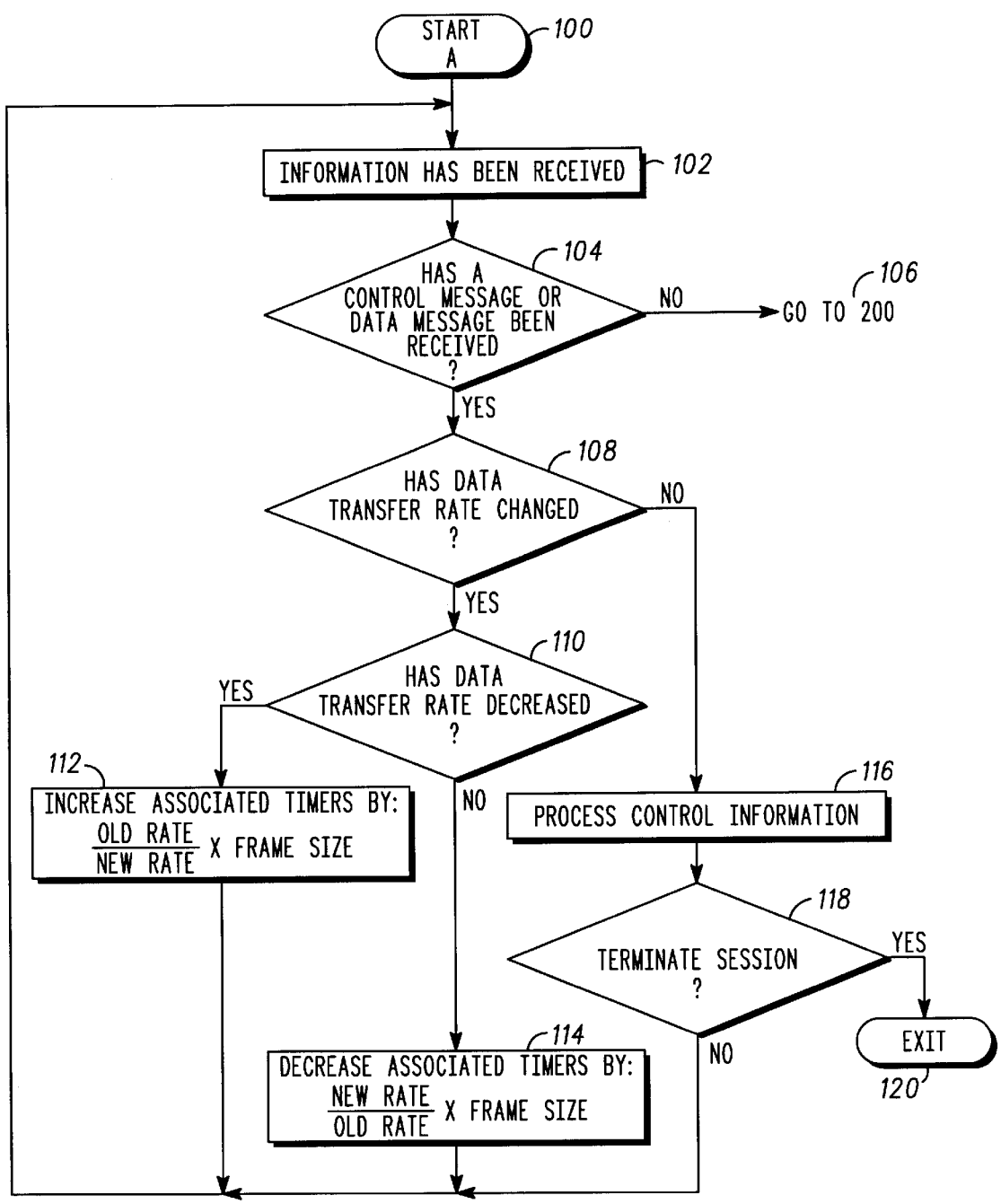
FIG. 1 is a flow chart of a software routine executed in one embodiment of the invention.

While the invention will be described in connection with preferred embodiments described herein, it will be understood that it is not intended to limit the invention to these embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

A method and apparatus for automatically adjusting a communication timer for a communication network is described herein and includes a communication device capable of receiving data indicating that a data transfer rate has varied from a previous data transfer rate to a new data transfer rate, determining the amount the data transfer rate has varied, and adjusting the communication timer from one set timed interval to a different set timed interval to automatically account for the varying data transfer rate and for optimizing data transfer between networked components. Thus, the communication device does not operate independent of the data transfer rate of the network and can account for situations where the network condition has deteriorated, (e.g., an increase in network traffic, a deterioration in the channel condition or wireless link, etc.), requiring the networked components to communicate at a slower data transfer rate or situations where the network condition has improved, (e.g., a decrease in network traffic, an improvement in channel condition or wireless link, etc.), allowing the networked components to communicate at a faster data transfer rate. Such capabilities allow the network to optimize the data communications between the networked components and increase the overall network system capacity and throughput. More particularly, the invention minimizes delay time and minimizes the amount of increased traffic on the network due to the generation of unnecessary and/or redundant acknowledgment signals.

The method and system for automatically adjusting a communication timer for a communication network includes a communication device such as a transceiver that is capable of receiving data or transmissions at a variety of data transfer rates (or transmission rates). The communication device also transmits an acknowledgment corresponding to the data received. For example, the communication network may require the communication device to acknowledge receipt of data with an acknowledgment (ACK) signal, or acknowledge failure of receipt of data with a negative acknowledgment (NAK) signal. In some networks, the communication device may have to transmit an ACK signal and a NAK signal.

The system has a communication timer for tracking the amount of time it takes to receive data after the communication device has transmitted an ACK or NAK signal. For example, if the communication device detects that certain data has not been received successfully, it will transmit a NAK signal and start a NAK retransmission timer. If the communication device receives retransmission of the desired data prior to expiration of the timer, the communication device reconstructs the received data according to its sequence number and continues to communicate with the networked component with which it is communicating. If the communication device does not receive retransmission of the desired data prior to expiration of the timer, the communication device assumes that the NAK signal was not correctly received, and retransmits the NAK signal and restarts the NAK retransmission timer. If the desired retransmission of data is received after the second attempt, the communication device reconstructs the data according to its sequence number and continues to communicate with the networked component with which it is communicating. If the desired retransmission of data is again not received prior to the timer's expiration, the communication device presumes that the NAK signal was again lost or not correctly received and retransmits the NAK signal and restarts the retransmission timer. This process can continue, however, most communication standards or protocols call for the communication device to retransmit the NAK signal three times and then abort its efforts if the desired data is not retransmitted after the third attempt.

The present system adjusts the communication timers from one set timed interval to another set timed interval to automatically account for varying data transfer rates for optimizing data transfer between the networked components. More particularly, the communication device receives data indicating that the data transfer rate between the networked components has varied from one data transfer rate to another data transfer rate. Typically, the data transfer rate decreases due to increased traffic on the network or a deterioration in channel condition, however the opposite situation (e.g., where the data transfer rate increases due to decreased traffic on the network or improved channel conditions) may occur. In one embodiment, the data indicating that the data transfer rate has varied from a previous data transfer rate to a new transfer rate comprises a control signal, such as a data rate shift notification signal, which identifies how much the data transfer rate has changed. In another embodiment, the data indicating that the data transfer rate has varied from a previous data transfer rate to a new transfer rate comprises an unrequested data signal, such as a signal comprising only a portion of the requested data or a signal comprising the requested data plus an additional portion of information, which the communication device can process to determine an approximation of how much the data transfer rate has changed.

A software routine flow chart (flow chart A) for the embodiment in which a control signal has been received is shown in FIG. 1, and begins at step 100. The step 102, a data frame of information has been received, and in step 104, the communication device determines whether the data frame of information includes a control signal, such as a data rate shift notification signal, or whether it is comprised of regular communication data If regular communication data, (e.g., voice, facsimile, etc.), has been received, the communication device, in step 106, jumps to step 200 of subroutine flow chart B to determine if the data received indicates that a rate shift has occurred or whether the information received should be processed without changing the associated communication timer(s). If a control signal (e.g., data rate shift notification signal) has been received, control shifts from step 104 to step 108, and the communication device determines whether the control signal indicates that a new communication channel data transfer rate has been assigned. If a new data rate has been assigned, control transfers to step 10 and the communication device determines whether the data transfer rate has increased or decreased.

If the data transfer rate has decreased, usually meaning the amount of traffic on the network has increased or the channel condition has deteriorated, control is transferred to step 112 and the associated timer is increased by an amount corresponding to the old data rate (or previous data rate) divided by the new data rate and multiplied by the frame size (or amount of time it takes to transmit or generate one frame). More particularly, the number that is determined by taking the old data rate divided by the new data rate is approximately equal to the minimum number of frames that are needed in order for the retransmission of the requested data to be completed. Therefore, the associated timer will be increased by an amount approximately equal to the number of frames required for retransmission multiplied by the frame size. After adjusting the associated timer, control is then transferred back to step 102 where the communication device receives additional data.

For example, in a wireless telecommunications network, if a mobile station and a base station are communicating at 460.8 kbps and the RLP frame size is 20 milliseconds (ms), and channel conditions change such that the data rate needs to be shifted to 76.8 kbps, the communications device will increment the NAK retransmission timer for all outstanding NAK signals between the next expected octet for sequential delivery (V(N)) and the next new octet expected (V(R)) to an amount approximately equal to the timer's initial value plus 120 ms. The 120 ms is derived from taking the old data rate (460.8 kbps) divided by the new data rate (76.8 kbps), which gives you the minimum number of frames required for completing retransmission, and multiplying the resultant by the frame size according to the RLP (20 ms). Other factors that may affect data transmission rates, such as propagation delay, are not considered in this adjustment.

If the data transfer rate has increased, usually meaning the amount of traffic on the network has decreased or the channel condition has improved, control is transferred to step 114 and the associated timer is decreased by an amount corresponding to the new data rate divided by the old data rate (or previous data rate) multiplied by the frame size. Similar to the earlier described opposite situation, (i.e., increased network traffic), the number that is determined by taking the new data rate divided by the old data rate is approximately equal to the minimum number of frames that are needed in order for the retransmission of the requested data to be completed. However, in this case, the associated timer will be decreased by an amount approximately equal to the number of frames required for retransmission multiplied by the frame size for that particular network. After adjusting the associated timer, control is then transferred back to step 102 where the communication device receives additional data. Alternatively, in this instance where the data transfer rate is actually increasing, such as due to decreased network traffic or improved channel conditions, the timers can be left alone as they can be set to a minimum default level beyond which they need not be lowered while still having efficient network communications.

It is desirable, however, to lower the timers where they have been previously decreased over their base or default level, such as, if the data transfer rate of the wireless network changes from 76.8 kbps back to 460.8 kbps, the communications device will decrement the NAK retransmission timer for all outstanding NAK signals to an amount approximately equal to the timer's adjusted value at the lower 76.8 kbps data transmission rate minus 120 ms. The 120 ms is derived from taking the new data rate (460.8 kbps) divided by the old data rate (76.8 kbps), which gives one the number of frames that are no longer required for completing retransmission, and multiplying the resultant by the amount of time it takes to generate a frame according to the RLP (20 ms).

If a control signal is received in step 104 and the communication device determines that the control signal is not a data rate shift notification signal in step 108, control is transferred to step 116 where the communication device processes the received control information. In step 118, the communication device determines whether the information received is also instructing it to terminate the session. If the information received is not instructing the communication device to terminate the session, control is transferred back to step 102 and the device continues to process received data. If, however, the information received comprises an instruction to terminate the session, control is transferred to step 120 and the networked components cease communicating.

Figure 2:
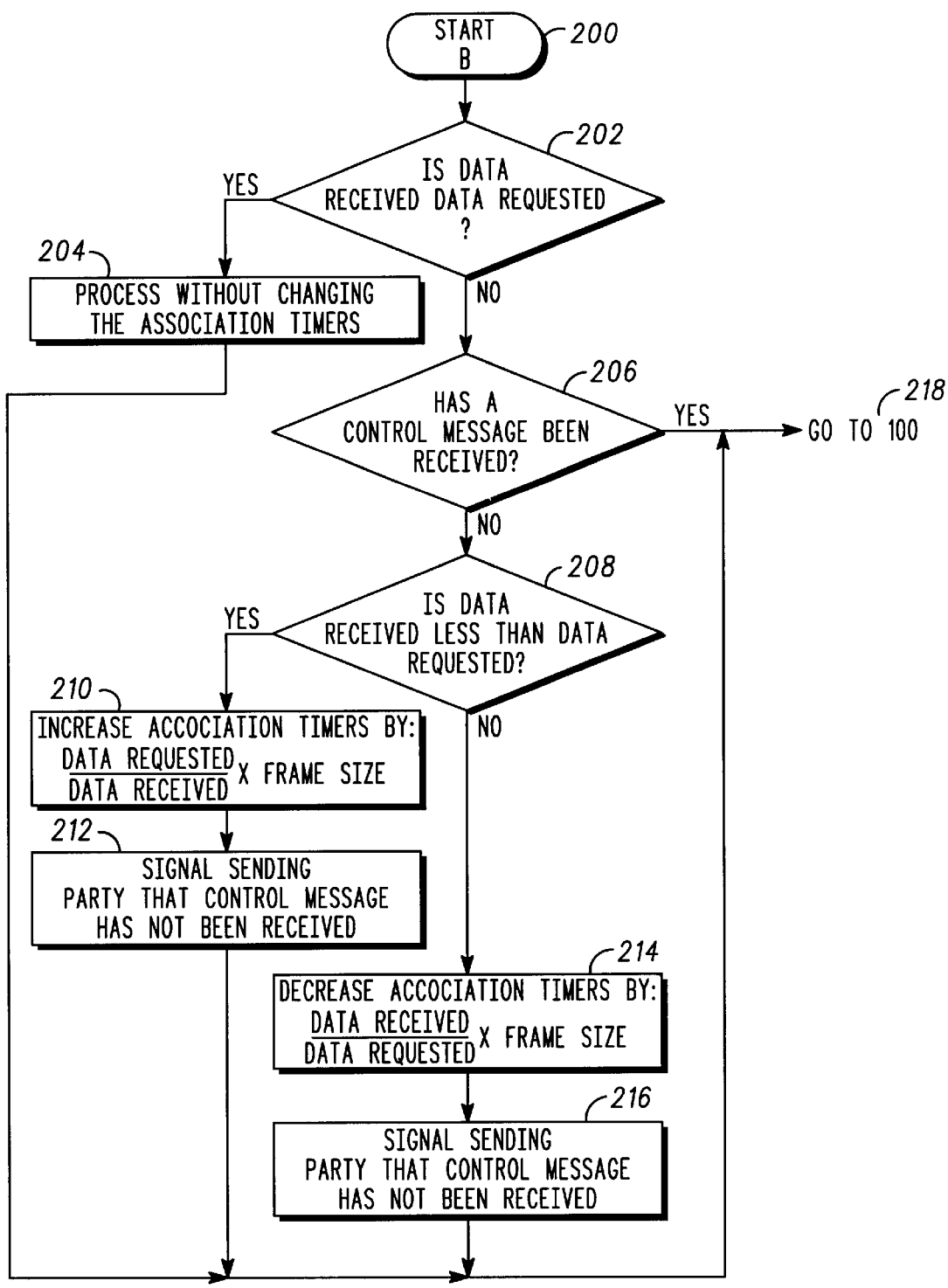
FIG. 2 is a flow chart of a software routine executed in another embodiment of the invention.

A software subroutine flow chart (flow chart B) for the embodiment in which the communication device uses an unrequested data signal, (e.g., a signal containing only part of the requested information, or a signal containing the requested information plus an additional portion of information), to determine an approximation of how much the data transfer rate has changed is shown in FIG. 2 and begins at step 200. An example of why such a subroutine may be needed is in situations where the control signal accompanying data (which indicates that a data transfer rate shift has occurred) is delayed or lost leaving only the rate shifted data to be received by a networked component. Rather than allowing the networked component to resend an unnecessary acknowledgment signal, (e.g., unnecessary in that the material may have been contained in the signal received), this subroutine would allow the networked component receiving the data to process the data and approximate whether a rate shift has occurred. In step 202, the communication device determines whether the information received is the information requested by the communication device, (e.g., does the received data comprise the information requested in the communication device's NAK signal).

If the information received is the information requested, control transfers to step 204, the information is processed without changing the associated timer, and control Jumps out of the subroutine and back to step 100 of the main routine. If the information received is not the information requested (e.g., is less or more than the information requested), control transfers to step 206 and the communication device determines whether a control signal, such as a data rate shift notification signal, has been received.

If a control signal has not been received, control transfers to step 208 and the communication device determines if the data received is less than the data requested. If the data received is less than the data requested, (indicating that the data transfer rate has decreased), control shifts to step 210 and the associated timers (e.g., communication timers) are adjusted to approximate the amount of time that needs to be added to each timer to account for the slower transfer rate. More particularly, the communication device approximates the increase required for the associated timer by taking the total amount of data requested divided by the amount of data received (which gives an amount that is approximately equal to the minimum number of frames that are needed in order for the retransmission of the requested data to be completed) and multiplying the resultant by the frame size in that particular network. The initial or base value of the associated timer is then increased by this amount.

Figure 3:
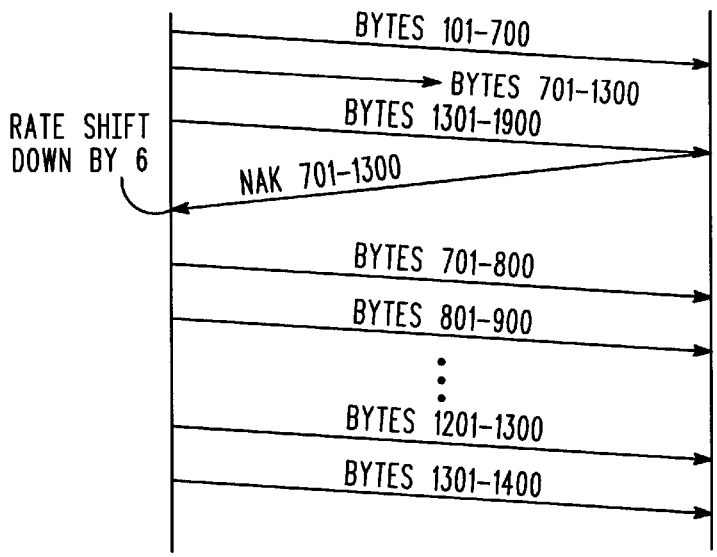
FIG. 3 is a diagram showing exemplary data transmissions and associated NAK signals between mobile and base stations in accordance with the embodiment of FIG. 2.

For example, in FIG. 3, a mobile station in a wireless telecommunications network receives a frame of data from a base station includes bytes 101–700, and another frame of data including bytes 1301–1900. The mobile station notes that it is missing the frame of data including bytes 701–1300 and generates a NAK signal to the base station requesting retransmission of this information. Meanwhile, network traffic increases or channel conditions deteriorate to such an extent that the channel conditions require the data rate between the base station and the mobile station to be shifted down by a factor of six, (e.g., as discussed in the first example under FIG. 1 above). However, the control signal or data rate shift notification signal, fails to reach the mobile station (e.g., the signal is lost, delayed, etc.) with the base station's response to the NAK signal comprising bytes 701–800. Therefore, the mobile station has received an unrequested data signal (albeit partially complete) which includes data that is less than the amount requested. The mobile station approximates the data rate shift by taking the total amount of data requested (600 bites) divided by the amount of data received (100 bytes). This number represents the minimum number of frames needed to receive the requested retransmission, and is multiplied by the frame size (20 ms) to get the total amount of time that is to be added to the associated timer's initial value in order to receive the requested retransmission. Therefore, the mobile station adds 120 ms to the initial NAK timer value to ensure that the entire retransmission can be completed and to avoid having the mobile transmit an unnecessary second NAK signal.

Turning back to FIG. 2, once the associated timer is increased in step 210, control transfers to step 212 and the communication device transmits a signal to the networked component with which it has been communicating notifying it that the control signal indicating the new data rate has not been received. Upon receiving such notice, the networked component retransmits a control signal identifying the new data transfer rate. The communication device continues to approximate the data transfer rate until it has received the control signal from the networked component. Control then transfers back to step 100 of the main routine flow chart via step 218.

If a control signal has not been received and the data received is not less than the data requested (indicating that the data transfer rate has increased), control transfers from step 208 to step 214 and the associated timers are adjusted to approximate the amount of time that can be subtracted from each timer to account for the faster transfer rate. This assumes the timers have already been adjusted upwardly from their initial base level. More particularly, the communication device approximates the decrease permitted for the associated timer by taking the amount of data received divided by the total amount of data requested (which gives an amount that is approximately equal to the number of frames that are no longer needed in order for the retransmission of the requested data to be completed) and multiplying the resultant by the frame size in that particular network. The already adjusted value of the associated timer is then decreased by this amount.

If in the example above, the mobile station received six frames of data (100 bytes each) from the base station comprising bytes 101–700, and another frame of data comprising bytes 801–900, it would again transmit a NAK signal requesting retransmission of the data comprising bytes 701–800; and if the network traffic decreased or channel conditions improved to such an extant that the channel conditions were now capable of handling a data transfer rate increased by a factor of six, and the control signal accompanying the base station's response to the NAK signal failed to reach the mobile station. The mobile station would receive an unrequested NAK response signal (albeit inclusive of the entire data requested) which comprises data that is more than the amount requested. Rather than sending an unnecessary second NAK request, the mobile station would process the data and approximate the new data transfer rate. The data rate shift would be approximated by taking the amount of data received (600 bites) divided by the total amount of data requested (100 bites). This number represents the minimum number of frames needed to receive the requested retransmission, and is multiplied by the frame size for the network (20 ms) to get the total amount of time that is to be subtracted to the associated timer's initial value in order to receive the requested retransmission. Therefore the mobile station subtracts 120 ms from the initial NAK timer value to retrieve the NAK response and avoid having the mobile transmit an unnecessary second NAK signal.

Once the associated timer is decreased in step 214, control transfers to step 216 and the communication device transmits a signal to the networked component with which it has been communicating notifying it that the control signal indicating the new data transfer rate has not been received. Upon receiving such notice, the networked component retransmits a control signal identifying the new data transfer rate. The communication device continues to approximate the data transfer rate until it has received the control signal from the networked component. Control then transfers back to step 100 of the main routine flow chart via step 218.

If during step 206, the communication device determines that a control signal has been received, control shifts back to step 100 of the main routine flow chart (FIG. 1) via step 218 and the communication device processes the control signal as set forth above.

Figure 4:
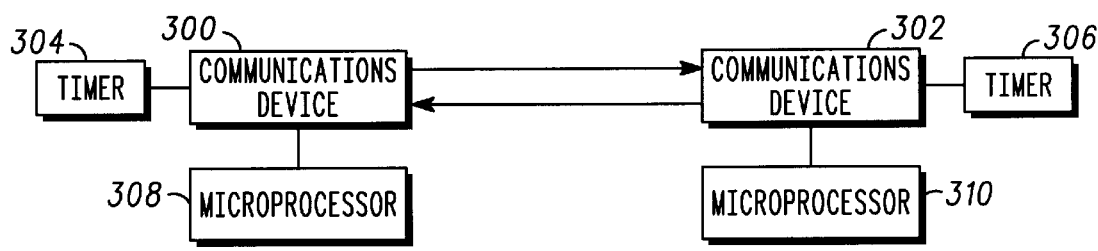
FIG. 4 is a block diagram of a wireless network operating according to the invention.
Figure 5:
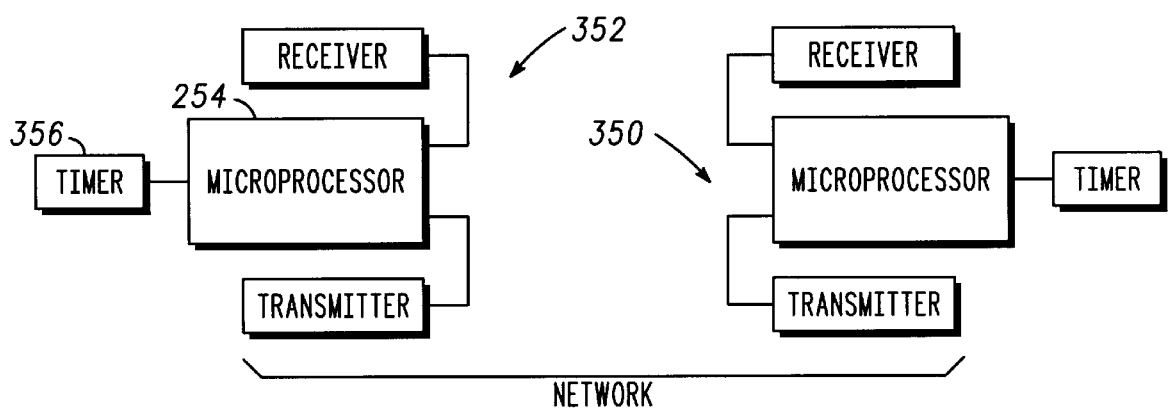
FIG. 5 is a block diagram of a network including communication devices operating according to the invention.

FIGS. 4 and 5 depict block diagrams of communications systems and their devices operating according to the invention in hard-wired and wireless networks, respectively. Other systems where portions are hard-wired and other portions are wireless are also contemplated by the present invention. In FIG. 4, communication devices 300 and 302, which are capable of receiving data at a variety of data transfer rates and transmitting acknowledgment signals corresponding to the received data, are shown. The communication devices further comprise timers 304 and 306 for tracking the amount of time it takes to receive data (e.g., a response) after transmitting an acknowledgment, and microprocessors ($\mu$Ps) 308 and 310, or microcontrollers, for detecting when the data transfer rate between the communication devices 300 and 302 has changed via the manners discussed above and adjusting the timers 304 and 306 from one set timed interval to another set timed interval to account for the varying data transfer rate.

In FIG. 5, a system comprising a transmitter 350 for transmitting data to a receiver at a variety of data transfer rates, and a receiver 352 for receiving data from transmitter 350 is shown. The receiver 352 further comprises a processor 354 (e.g., a microprocessor or microcontroller) for determining if the transmitted data has been completely received and for generating an acknowledgment signal in response to this determination, and a timer 356 for tracking the amount of time it takes to receive data after the acknowledgment signal has been generated and capable of being automatically adjusted from one set timed interval to a different set timed interval by the processor to account for varying data transfer rates.

Thus it is apparent that there has been provided, in accordance with the invention, a method and apparatus for adjusting a communication timer for a communication network that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations that fall within the spirit and broad scope of the appended claims.

What is claimed is:

1. A method of optimizing data communications in a network comprising a transmitting component and a receiving component, the method comprising:

receiving data indicating that a data transfer rate has varied from a previous data transfer rate to a new data transfer rate;

determining an amount the data transfer rate has varied; and adjusting a communication timer from one set timed interval to a different set timed interval to automatically account for the varying data transfer rate for optimizing data transfer between the networked components, wherein the amount the communication timer is adjusted is determined by calculating the a ratio of different transfer rates and multiplying by a frame size.

2. A method of optimizing data communications in a network comprising a transmitting component and a receiving component, the method comprising:

receiving data indicating that a data transfer rate has varied from a previous data transfer rate to a new data transfer rate;

determining an amount the data transfer rate has varied; and adjusting a communication timer from one set timed interval to a different set timed interval to automatically account for the varying data transfer rate for optimizing data transfer between the networked components, wherein the data transfer rate has decreased and the amount the data transfer rate has varied is determined by dividing the previous data transfer rate by the new data transfer rate to provide a number of frames that accounts for the varying data transfer rate and multiplying the number of frames by an amount of time it takes to transmit a frame to provide the amount of time by which the one set timed interval is increased to the different set timed interval to account for the varying data transfer rate.

3. A method according to claim 2, the method further comprising:

sending an acknowledgment signal from the receiving component to the transmitting component;

initiating the communication timer to begin counting a set timed interval; and monitoring the data transfer rate between the networked components.

4. A method of optimizing data communications in a network comprising a transmitting component and a receiving component, the method comprising:

receiving data indicating that a data transfer rate has varied from a previous data transfer rate to a new data transfer rate;

determining an amount the data transfer rate has varied; and adjusting a communication timer from one set timed interval to a different set timed interval to automatically account for the varying data transfer rate for optimizing data transfer between the networked components, wherein the data transfer rate has increased and the amount the data transfer rate has varied is determined by dividing the new data transfer rate by the previous data transfer rate to provide a number of frames that accounts for the varying data transfer rate and multiplying the number of frames by an amount of time It takes to transmit a frame to provide the amount of time by which the one set timed interval is decreased to the different set timed interval to account for the varying data transfer rate.

5. A method according to claim 4, the method further comprising:

sending an acknowledgment signal from the receiving component to the transmitting component;

initiating the communication timer to begin counting a set timed interval; and monitoring the data transfer rate between the networked components.

6. A method of optimizing data communications in a network comprising a transmitting component and a receiving component, the method comprising:

receiving data indicating that a data transfer rate has varied from a previous data transfer rate to a new data transfer rate;

determining an amount the data transfer rate has varied; and adjusting a communication timer from one set timed interval to a different set timed interval to automatically account for the varying data transfer rate for optimizing data transfer between the networked components, wherein the receiving step includes receiving a data rate shift notification signal which comprises a data rate shift factor and the different set timed interval is equal to the data rate shift factor multiplied by a frame size.

7. A method according to claim 6, wherein the receiving step includes receiving an unrequested data signal indicating that the data transfer rate has varied from the previous data transfer rate to the new date transfer rate.

8. A method according to claim 6, wherein the adjusting step includes adjusting the communication timer proportionally to the amount the data transfer rate has varied.

9. A system for optimizing data communications in a network, the system comprising:

a transmitter for transmitting data to a receiver at a variety of data transfer rates;

a receiver for receiving data from the transmitter;

a processor for determining if the transmitted data has been received and for generating an acknowledgment signal in response to this determination; and an adjustable timer that tracks an amount of time it takes to receive data after the acknowledgment signal has been generated and which is automatically adjusted from one set timed interval to a different set timed interval by the processor to account for varying data transfer rates wherein the generated acknowledgment signal is a negative acknowledgment (NAK) signal and the timer is automatically adjusted from one set timed interval to a different set timed interval by the processor upon receipt of a data rate shift notification signal.

10. A system according to claim 9, wherein the data rate shift notification signal comprises a data rate shift factor and the different set timed interval of the timer is equal to the data rate shift factor multiplied by the amount of time it takes to transmit one frame of data.

11. A system according to claim 9, wherein the generated acknowledgment signal is a negative acknowledgment (NAK) signal and the timer is automatically adjusted from one set timed interval to a different set timed interval by the processor upon receipt of an unrequested data signal.

12. A system according to claim 11, wherein the amount the timer is adjusted is determined by taking the amount of data requested divided by the amount of data received to obtain a rate shift factor and multiplying the rate shift factor by the amount of time necessary to transmit one frame of data.

13. A system according to claim 11, wherein the amount the timer is adjusted is determined by taking the amount of data received divided by the amount of data requested and multiplying by the amount of time necessary to transmit one frame of data.

14. An apparatus for optimizing data communication in a network, the apparatus comprising:

a communication device for receiving data at a variety of data transfer rates and transmitting an acknowledgment corresponding to the received data;

a communication timer for tracking an amount of time it takes to receive data after transmitting the acknowledgment; and a processor configured to detect when the data transfer rate has changed and to adjust the communication timer from one set timed interval to a different set timed interval to account for the varying data transfer rate, wherein the communication device is a transceiver and the processor detects data transfer rate change via reception of a data rate shift notification signal which comprises a data rate shift factor and the different set timed interval is equal to the data rate shift factor multiplied by a frame size.

15. The apparatus of claim 14, wherein the acknowledgment is a negative acknowledgment (NAK) signal indicating that an error has occurred in receiving data and requesting retransmission of such data.

16. The apparatus of claim 14, wherein the acknowledgment is an acknowledgment (ACK) signal indicating that the data has been received successfully.

17. The apparatus of claim 14, wherein
the processor detects data transfer rate change via reception of an unrequested data signal.

* * * * *